United States Patent

Ribeiro et al.

[11] Patent Number: 6,036,749
[45] Date of Patent: Mar. 14, 2000

[54] HELICAL SEPARATOR

[75] Inventors: Geraldo Afonso Spinelli Martins Ribeiro; Divonsir Lopes; Osvaldo Roberto Do Vale, all of Rio de Janiero; Fernando De Almeida França; Eugênio Spanó Rosa, both of Campinas; Maurício Gargaglione Prado, Rio de Janeiro, all of Brazil

[73] Assignee: Petroleo Brasileiro S.A. - Petrobras, Rio de Janiero, Brazil

[21] Appl. No.: 09/134,946

[22] Filed: Aug. 17, 1998

[30] Foreign Application Priority Data

Aug. 26, 1997 [BR] Brazil .................................. 9704499

[51] Int. Cl.⁷ .................................................. B01D 19/00
[52] U.S. Cl. ........................ 95/261; 96/208; 96/216; 210/188
[58] Field of Search ........................... 95/261; 96/208, 96/216; 210/188

[56] References Cited

U.S. PATENT DOCUMENTS

| | | | |
|---|---|---|---|
| 2,941,619 | 6/1960 | Sochor | 96/208 |
| 3,157,478 | 11/1964 | Edwards | 95/261 |
| 4,344,774 | 8/1982 | Skipper | 95/261 |
| 4,687,585 | 8/1987 | Ramshan | 95/261 |
| 4,900,433 | 2/1990 | Dean et al. | |
| 4,981,175 | 1/1991 | Powers | 95/261 |
| 5,252,229 | 10/1993 | Rojey et al. | 95/261 |
| 5,462,585 | 10/1995 | Niskanen et al. | 95/261 |
| 5,474,601 | 12/1995 | Choi | 96/208 |
| 5,531,811 | 7/1996 | Kloberdanz | 95/261 |
| 5,902,378 | 5/1999 | Obrejanu | 95/261 |

FOREIGN PATENT DOCUMENTS

PI95043500 2/1997 Brazil .

*Primary Examiner*—David A. Simmons
*Assistant Examiner*—Minh-Chau T. Pham
*Attorney, Agent, or Firm*—Sughrue, Mion, Zinn, Macpeak & Seas, PLLC

[57] ABSTRACT

A liquid/gas helical separator operates on a combination of centrifugal and gravitational forces. The separator includes a primary separator formed basically by an expansion chamber, a secondary separator formed basically by a helix for directing the flow, a tertiary separator which consists of a reservoir or gravitational-separation tank and of a transition region between the primary and secondary separators, which consists of at least two variable-pitch helixes whose inclination varies from an angle of 90° to the angle of inclination of the constant-pitch helix of the secondary separator with the function of providing a gentler flow of the liquid phase at the transition between the first two separators.

11 Claims, 3 Drawing Sheets

HELICAL SEPARATOR

FIELD OF THE INVENTION

The present invention relates to equipment for use in processes for separating multi-phase mixtures in general industrial applications, based on the difference in density of the phases, which is particularly applicable to mixtures of gases in liquids, combining centrifugal force with the force of gravity. More specifically, however, it is an item of equipment used most effectively in petroleum production and can be applied both during production and also during petroleum-well drilling operations, particularly in the case of offshore reservoirs located at great depths or on marginal land reservoirs. The invention also applies generally to the petrochemical industry or the chemical industry.

BACKGROUND OF THE INVENTION

Crude oil is found naturally in a mixture with water and gas. One issue that needs to be resolved immediately, when the ascending pressure is low, is the choice of the way in which it will be transported from the well head to the site where the petroleum will initially be processed. The reason for this is that it may be transported by natural, multi-phase flow, by means of multi-phase pumping (mixed with gas) or by means of pumping only the liquid component after separation of the gas phase from the petroleum. The decision in favour of one of the above-mentioned methods will depend, amongst other factors, on the characteristics of the reservoir, the characteristics of the fluids produced and environmental conditions.

One of the objectives of the present invention is to promote the efficient separation of the gas mixed with the petroleum, even on the sea bed, inside a dummy well, in such a way as to make the exploitation of certain hydrocarbon reserves located in deep ocean waters viable.

One of the principal advantages of separation on the sea bed, in a dummy well, consists in the reduction of the flow pressure of the petroleum at the bottom of the well, which permits greater recovery of the petroleum from the reservoir. The increase in production occurs because the pressure at the well head is reduced to the operating pressure of the separator, which is substantially less than the hydrostatic pressure of the depth of water or than the hydrostatic pressure of a production pipeline to the offshore platform. The separation of the stream of petroleum originating at the reservoir into two distinct streams, one of liquid and the other of gas, enables reserves to be exploited using conventional technologies which are well-known in the petroleum industry. The gas is raised by the difference in pressure between the separator and the receiving vessel located on the platform, whilst the liquid stream may be lifted, for example, using submerged centrifugal pumping (SCP) or another suitable artificial lift technique.

A further advantage of using separation on the sea bed, in the case of offshore petroleum production, lies in the possibility of saving physical space and reducing the load on the platform deck.

Yet a further significant advantage of this separation process, in connection with a natural reservoir, relates to monitoring of the reserves, since, if the flows of liquid and gas are separated, they can be measured more easily. This fact is highly significant, principally when one considers the difficulties involved in measuring a multi-phase flow. Monitoring the individual production of liquid and gas will also permit better control over production at the petroleum reservoir.

A further application of the invention, during petroleum-well drilling operations, is to the separation of gases which may be mixed with the drilling fluids.

The invention may also be applied in industry outside the area of petroleum production. In this case, restrictions of a dimensional nature are largely eliminated.

PRIOR ART

Amongst the most recent developments in this area, mention may be made of the fairly promising concept known as VASPS (Vertical Annular Separation and Pumping System), which enables an integral submerged separator/pump unit to be installed in the 0.75 m (30-inch) pipe used in conventional underwater production systems. This system allows the use of standardized equipment for lining wells, well heads and guide bases and uses a submerged pump embedded in the lining of the well in order to withdraw the liquid phase via a pipe dedicated to this purpose. The gas is separated and produced via another pipe which is kept at well-head pressure.

This system is described in detail in U.S. Pat. No. 4,900,433 of Feb. 13, 1990 belonging to The British Petroleum Company, and also in the work of J. Gregory entitled "VASPS (Vertical Annular Separation and Pumping System) Sends Subsea Separation on Downward Spiral to Success", which was published in Offshore Engineering in August 1989, pages 35–36.

The VASPS design combines the operational feature of integrating the separator and the submerged pump, forming a compact unit which also offers the possibility of measuring the production flow. It principally makes use of centrifugal force in order to separate the liquid and the gas.

Laboratory tests simulating the system described above have revealed a number of disadvantages and inefficient aspects which ought to be considered, namely:

i) excessive quantity of liquid (oil mixed with water) in the gas line (LCO or liquid carry over), which restricts the gas/liquid separation capacity of the equipment and limits its operational scope. Any interruptions in the multi-phase gas/liquid flow in the line feeding the separator cause liquid to be entrained to the gas pipe;

ii) the operational concept of the design, which imposes a descending flow of liquid and gas in the initial stage of the equipment (separator head). This descending flow of a mixture of liquid and gas causes an excessive loss of pressure in the flow, which leads to an unnecessary rise in the well-head pressure, resulting in lower overall production of hydrocarbons from the reservoir.

With a view to solving the problems mentioned above, the invention which is the subject of Brazilian Application PI 9504350 (Improved Oil and Gas Separator) makes provision for the incorporation, into the prior-art unit mentioned above, of a cylindrical part which functions as a primary separator, replacing the conical portion of the separator body. A lateral opening for the tangential entry of the fluids produced is located at an intermediate point on this cylindrical part. In the upper internal part, the primary separator has orifices which communicate with a longitudinal central pipe which conducts the gases to the separator outlet pipe. The separation of gas takes place by means of combined centrifugal and gravitational forces.

In this way, the primary separator acts as if it were an expansion chamber integrated with a centrifugal separator, promoting better separation of the phases due to the eduction effect and allowing operation at lower pressures close to the export line pressure. The primary separator has a compact tubular geometry which is compatible with known offshore drilling technologies, including those which are suitable for deep water.

It is an object of the present invention to provide an improved separator unit of the type which consists of:

1) a primary separator formed by a cylindrical hydrocyclone with an expansion chamber and tangential entry at an intermediate point;

2) a secondary separator formed by a cylindrical chamber which contains a helix for directing the flow; and of a tertiary separator which consists of a reservoir or tank for gravitational separation.

It has been found, during experiments with such a separator, that the design described above also has a number of operating deficiencies, principally for higher flow rates, even within the envisaged operating band. These deficiencies are manifested in the form of an accumulation of liquid on the upper part of the helicoidal surface, and also affect the lower part of the expansion chamber. This effect is attributed to the sudden deceleration of the liquid/gas mixture as it passes through the expansion chamber to the helical separator.

SUMMARY OF THE INVENTION

The invention basically relates to an improved liquid/gas separator in which the liquid stream may consist of a multi-phase mixture, for example oil and water, or of a single-phase stream.

In Brazilian Application PI 9504350, provision was made for the incorporation of a two-phase vertical separator of conventional type, containing internal components, placed above the primary separator of the "VASPS" equipment. Said incorporation results in the following improvements:

i) it allows the gas to follow its natural flow, promoting more effective separation in the secondary separator and reducing liquid entrainment;

ii) the said separator can operate at lower pressures, which allows better control of pressure in the reservoir;

iii) the gas is separated by combining centrifugal and gravitational forces.

However, the manner in which the fluid enters the helicoidal surface, coming from the expansion chamber, results in a very sudden transition, causing an accumulation of liquid in the region, which may give rise to a carry-over of liquid to the gas line, particularly at high flow rates.

Accordingly, the present invention proposes the introduction of a transition region between the expansion chamber and the start of the helicoidal surface. This transition portion has an effect in that it causes a slight deceleration of the mixture of liquid with gas, already processed by the expansion chamber, going to the helicoidal surface. Said portion consists, in general terms, of two variable-pitch helixes, beginning with an angle of 90°, parallel to the direction of flow at the end of the expansion chamber. After approximately one and a half turns of the variable-pitch helicoidal surface, i.e. approximately 540°, it progressively reaches, with a slope of the order of 18°, the second stage of the separator which consists basically of a further helicoidal surface, this one having a constant pitch.

A second variable-pitch helicoidal surface in said transition part, out of phase with respect to the first helicoidal surface by a 180° angle, prevents the formation of a cascade onto the second pitch of the first helicoidal surface. Said first, principal, helicoidal surface and said second, auxiliary, helicoidal surface extend along a longitudinal central pipe. This second helicoidal surface may be interrupted, after a complete pitch, from the point where there would no longer be any free fall of fluid onto the second pitch of the principal helicoidal surface, or could continue as far as the lower part of the separator, acting as a flow divider and increasing gas/liquid separation.

If the liquid phase is accompanied by solids, as often happens in the petroleum industry, when the liquid is accompanied by a small amount of sand or gravel, the equipment may also be used since outlets are provided for the removal of solids which might accumulate in the lower part of the equipment. This may also be the case when using the separator of the invention in processes for separating drilling fluids and gases, such as, for example, in cases of under-balanced drilling or in the case of light fluids.

DETAILED DESCRIPTION OF THE INVENTION

To aid understanding of the invention, it will be described with reference to the Figures accompanying this specification. It should be pointed out, however, that the Figures illustrate only one preferred embodiment of the invention and therefore are not limiting in nature. If the inventive concept, to be described below, is complied with, it will be clear to specialists in the field that it is possible to use different formats, arrangements or complementary devices, an aspect which will be included in the scope of the invention.

Figure 1:
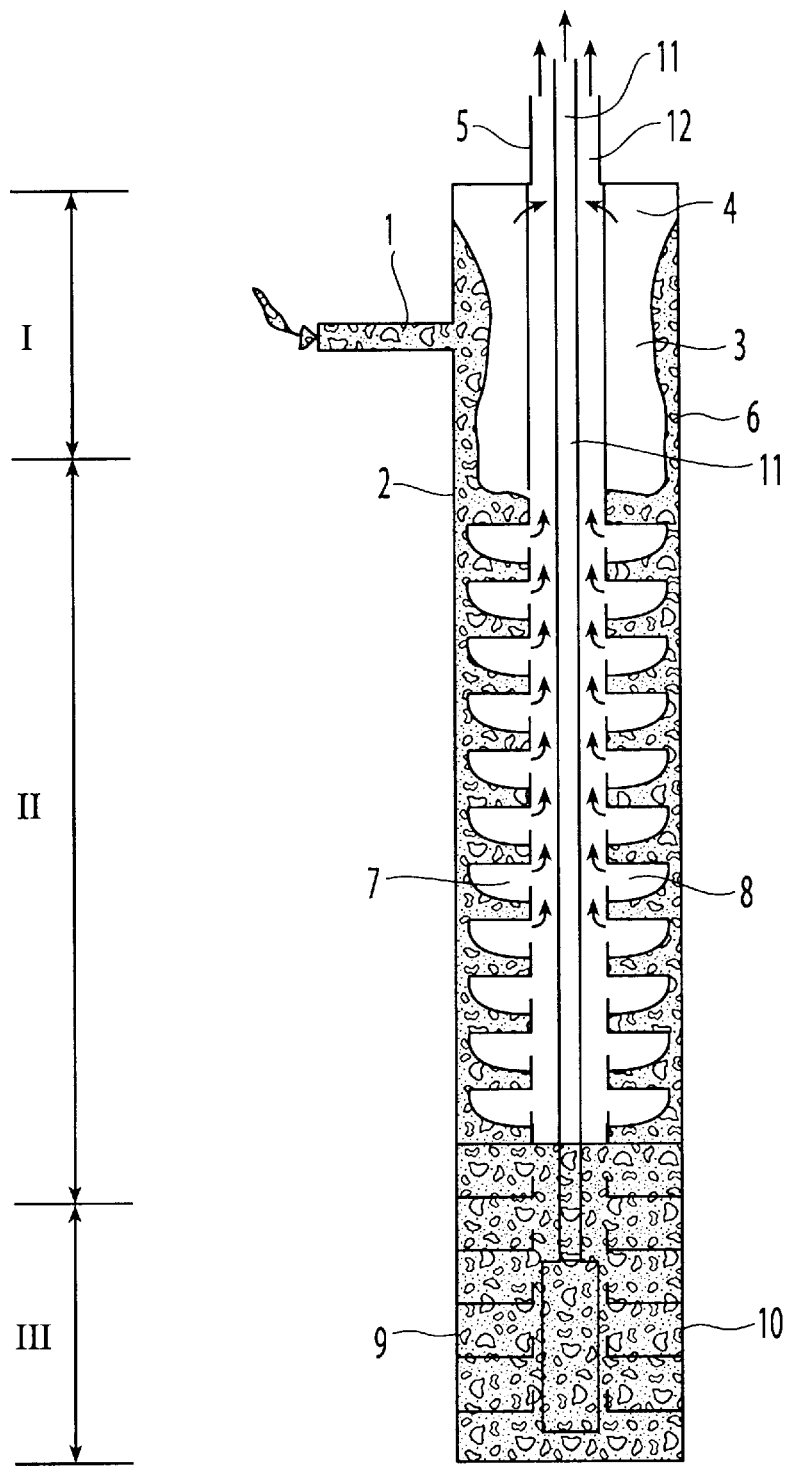
FIG. 1 shows a diagrammatic representation of the helical separator which is the subject of Brazilian Application PI 9504350.

FIG. 1 shows, diagrammatically, the concept used in the separator of Brazilian Application PI 9504350, which may be regarded as a step prior to the present invention.

The upper portion (I) represents the primary separator, the intermediate portion (II) represents the secondary separator and the lower portion (III) represents the tertiary separator.

In the primary separator (I), the mixture of liquid and gas produced in the petroleum well is transported via a pipe (1) and injected into a hydrocyclone (2) coupled to an expansion chamber (3). In this stage, a considerable proportion of the free gas, i.e. of the gas which is not in solution in the liquid, is segregated and extracted from the expansion chamber (3) by means of orifices (4) in the upper part of a longitudinal central pipe (5) which passes through the expansion chamber (3). The remainder of the free gas, meanwhile, is either separated from the liquid and flows in the central region of the hydrocyclone (2) and of the expansion chamber (3), or is dispersed in the liquid film (6) in the form of bubbles.

The liquid film (6) with dispersed bubbles of gas flows downwards in a helical trajectory imposed by the combined action of centrifugal force and the gravitational field in the direction of the secondary separator (II), or helicoidal surface (7). Over this run, the geometry of the hydrocyclone/expansion chamber (2, 3) system fulfils a number of significant roles, and amongst other things:

i) it promotes a separation of the gas from the bubbles dispersed in the liquid film (6), through the action of centrifugal force;

ii) it evens out the liquid film (6), which still contains residual dispersed bubbles, in the transverse section of flow, in order to bring about a "gentle" entry onto the helicoidal surface (7); and iii) it prevents the downward flow of free gas.

The portion of gas extracted in the hydrocyclone (2) and the liquid, with dispersed gas bubbles, therefore enter onto the helicoidal surface (7), which is formed in the secondary separator (II), describing a downward helical trajectory, guided by the helix. The composition of the centrifugal and gravitational forces tends to generate an arrangement of phases of the type indicated in FIG. 1, i.e. a stratified pattern. The stratified gas phase, being lighter, occupies the upper, inner portion of the transverse section.

A set of orifices (8) arranged uniformly in the longitudinal central pipe (5), along the vertical axis of the separator, about which the helicoidal surface (7) develops, captures the separated gas. These orifices (8) are intended only for the extraction of the gas, which is why they are located immediately below the lower surface of each helicoidal surface. The gas which has still not been separated, in the form of dispersed bubbles, continues its downward trajectory with the liquid film, in the direction of the tank (9), which is described below. Owing to the action of the centrifugal and gravitational forces, these bubbles migrate to the liquid/gasmixture interface, making the oil increasingly "poorer" in terms of dispersed gas. The helicoidal surface (7) therefore has the function of:

i) enabling the free gas not extracted in the hydrocyclone to be removed; and ii) increasing the residence time of the mixture, i.e. liquid plus dispersed bubbles, forming the liquid film, so as to allow the migration of the bubbles to the interface and the consequent separation of the phases.

At the lower end of the helicoidal surface 7, the liquid film reaches the tertiary separator (III), i.e. a gravitational separation tank (9). In the entry region of the tank, any volume of gas not separated in the previous stages, in the form of bubbles dispersed in the liquid, is incorporated into a volume of gas, which is added to the liquid, by the impact of the liquid film in the tank (9), this process being known as "re-mixing".

The tertiary separator (III) therefore consists of a reservoir (9) of liquid which forms the last obstacle to the passage of the bubbles to the suction of the pump (10), installed downstream of this flow, or another form of liquid removal. This tertiary separator (III) acts as a conventional gravitational separator for the bubbles dispersed in the liquid which have not been separated from the flow upstream and for bubbles incorporated in the liquid by the impact of the liquid film (6) in the tank (9). The segregation of the liquid and the gas will take place, in this tertiary separator (III), only through the action of gravitational force.

After this trajectory through the various separators primary—(I), secondary (II) and tertiary (III)—the flows of liquid and gas flow via the respective central pipes; the central, innermost pipe (11) transports the liquid with the aid of a submersible pump (10) embedded in the tank (9) or through the action of the pressure existing in the separator. The separated gas flows through the annular space (12) between the two concentric central pipes (5, 11).

As already mentioned previously, in the separator described above, the form of injection of the fluid onto the helicoidal surface, coming from the hydrocyclone/expansion chamber (2, 3) unit, undergoes a very sudden transition, causing an accumulation of liquid in the lower part of the expansion chamber (3). To overcome this drawback, the present invention proposes a modification of the internal components of this separator.

In accordance with the present design, a transition zone is introduced between the regions I and II of FIG. 1 and this has a segmented helicoidal surface with an initial section which has a variable helix angle, starting from an attack angle of 90°, progressively diminishing to the value selected for the final section of the helicoidal surface's constant pitch.

Figure 2:
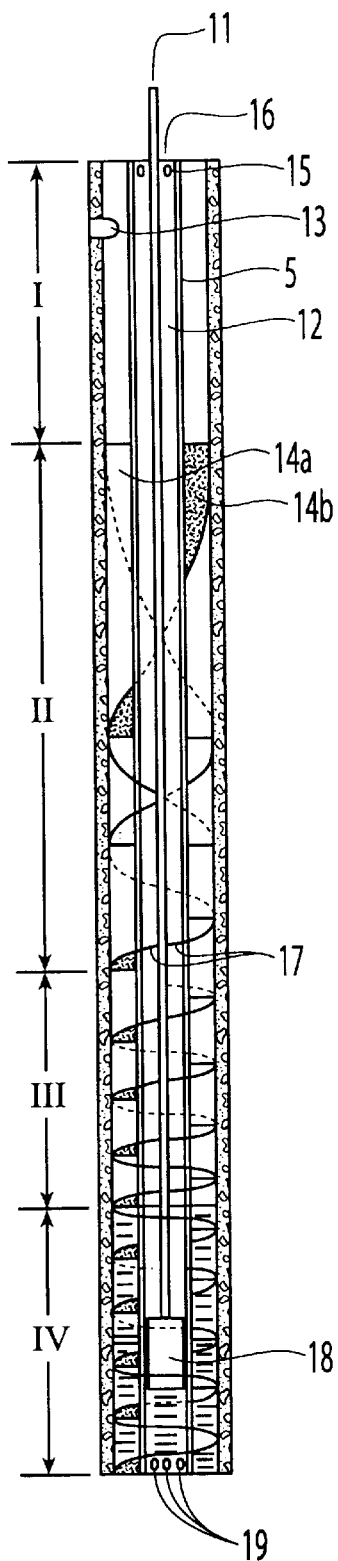
FIG. 2 shows, diagrammatically, one design of the improved helical eparator of this invention.
Figure 3:
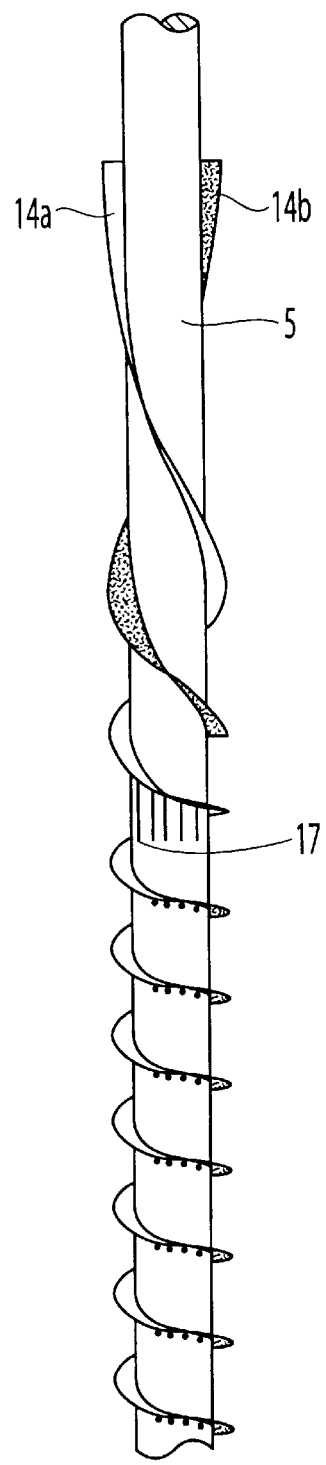
FIG. 3 shows, highlighted, a view of the transition portion, consisting basically, in this case, of two variable-pitch helicoidal surfaces, which is positioned between the first two stages of the separator of the invention.

FIG. 2 shows a diagrammatic representation of a preferred embodiment of the invention and FIG. 3 shows, highlighted, the transition portion (II) of the start of the helicoidal surface and the helicoidal surface (III), extending along a longitudinal centralized pipe (5), which, in turn, encloses a central pipe (11) intended for the discharge of the liquid phase. As may be seen in FIG. 2, the gas phase flows through the annular space (12) between the two pipes (5, 11) mentioned above.

The improved helical separator consists basically of the following principal parts: expansion chamber (I), transition region (II), helicoidal surface (III) and tank (IV). The separator has running through its entire length two centralized longitudinal pipes (5, 11), the pipe (5) being of larger diameter and enclosing the pipe (11) of smaller diameter which is used to collect and discharge the gas. The lower part of the separator contains a centrifugal pump (18). The longitudinal central pipe (11), of smaller diameter, is used for the forced discharge of the separated liquid phase.

The expansion chamber (I), or primary separator, contains, at an intermediate point, the injection nozzle (13) for the mixture and, in the upper part, there are orifices (15) for the passage of the separated gas to the annular space (12) between the two centralized pipes (5, 11). In this same FIG. 2, it is possible to see that the gas continues on its course through the annular space, passing out through the top (16) of the separator.

The transition region (II) is below the expansion chamber (I). This region consists basically of two variable-pitch helixes, the principal helix (14a) and the auxiliary helix (14b), which are out of phase by 180°. The auxiliary helix (14b), which is shorter, forms the couple in the initial vertical section and, owing to its phase displacement, prevents the formation of a cascade in the empty space, corresponding to the first pitch of the helix, acting as a buffer to prevent flooding of the chamber. This second helicoidal surface could be interrupted in the second pitch, at the point where there is no longer any free fall of fluid onto the second pitch of the principal helix, or could continue as far as the lower part of the separator, acting as a flow divider and increasing the gas/liquid separation.

The transition region (II) is followed by a helicoidal surface (III) of constant pitch, which is formed in the so-called secondary separator. Under the helicoidal surface, there are apertures (17) in the longitudinal central pipe (5) of greater diameter for the discharge of the separated gas. Said helicoidal surface (III) extends as far as the lower part of the separator.

The lower part of the separator is formed basically by the "tank" and is formed in the tertiary separator (IV). A volume of the mixture accumulates in the tank and, at this stage of the process, contains only a small percentage of the residual gas which will be separated under gravity. In the lower part of the tank there are apertures (19), in the central pipe, for the passage of the liquid phase to the inside of the longitudinal centralized pipe (5) of greater diameter, where the centrifugal pump (18) is located. The liquid phase reaches a suitable height, determined by operational conditions, so as to completely cover the pump (18).

The basic idea of designing the helix with an initial section of variable inclination is in order to obtain a transition, which is as "gentle" as possible, from the flow in the expansion chamber (I) to the flow onto the helicoidal surface (III). In accordance with the previous design, the two-phase stream, on leaving the nozzle, has a velocity in which the tangential component predominates, but it is simultaneously being accelerated axially by gravity. Upon flowing, as a film, via the wall of the expansion chamber, it extends in a sloping direction and progressively decelerates, in the tangential direction, through the action of viscosity. The direction of the flow, when it reaches the helicoidal surface, given the operational conditions, geometry of the expansion chamber and characteristics of the fluids, will also be determined by the axial distance, measured from the injection nozzle, in the direction of the helicoidal surface. Evidently, the most favourable situation, when attempting to minimize "disturbances" of the flow at the entry to the helicoidal surface, will be obtained if the direction of flow coincides with the inclination of the helix. A similar criterion applies to the design of flow machines, in which it is desired to minimize "impact losses" which occur at the entry to the equipment's rotor.

The angle of flow of the film, at axial positions below the nozzle, depends on the operational conditions of the separator. If this axial distance is small and the expansion chamber short, the angle of flow and the angle of the helix will correspond only for a specific operational condition. However, the distance may be such that, for one operational band of the separator, in terms of flow rate of gas and of liquid, the flow of the film will have only the axial component, after total deceleration of its tangential component. The angle of attack of the helix, at the start of the helicoidal surface, must therefore be 90°.

Briefly, then, for an angle of attack of the helix of 90° at the start of the helicoidal surface, the length of the lower part of the expansion chamber (below the nozzle) must be such that the liquid film, flowing against the wall, no longer has any tangential velocity component. In addition, as the flow may be modelled and there exists the possibility of testing this model and adjusting it using experimental data, the length of the lower part of the expansion chamber, from the nozzle as far as the start of the helix, may be calculated using rational models and criteria. Therefore, by setting the angle of attack of the helix at 90°, another design variable of the helical separator will then be established on the basis of a rational criterion, namely the length of the expansion chamber, from the opening for the injection of the mixture as far as the helix.

FIG. 3 shows the configuration of a helicoidal surface with two helixes, with variable angles of inclination, from 90° to approximately 18°, resulting from a study carried out for a particular situation. The shorter channel, in this particular case, extends as far as an angular position of 360°, when its inclination (angle of attack) is approximately 32.6°. The long channel, in the angular position of approximately 540°, from its start, reaches the inclination of 18° applied to the following section, consisting of the constant-pitch helicoidal surface. The double-entry helicoidal surface produces less "disturbance" in the flow in comparison with a helicoidal surface with a single entry.

By means of tests, it was found that the combination of the double-entry helix, with variable pitch in the development section (intermediate region of the equipment, between the expansion chamber (I) and the fixed-pitch helical separator (III)) and the greater inclination of the helical channel (greater pitch in the constant-pitch section of the helicoidal surface) resulted in equipment whose operational limit significantly surpasses that of the equipment which is the subject of Brazilian Application PI 9504350-0 mentioned above. In experiments, it was observed that, for flow rates approximately 30% greater than those which caused choking in the transition region and obstruction of the channel in the previous model, in this improved model of this version of the equipment the flow was processed without obstruction occurring in any section of the channel.

The separator of the invention may be used in cases where the flow regime of the multi-phase mixture, when it enters, is intermittent (slug flow). In this case, this flow has to be characterized so that it obtains the maximum instantaneous flow rate of the liquid/gas mixture at the entry to the separator, which constitutes one of the design conditions.

Figure 4:
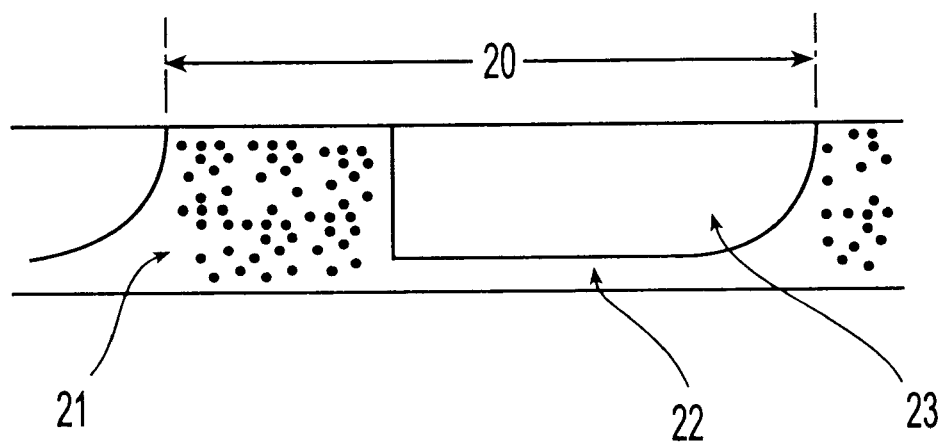
FIG. 4 illustrates and presents the nomenclature of a horizontal intermittent flow.

FIG. 4 shows, diagrammatically, a horizontal intermittent flow and the nomenclature used: length of the unit (20), liquid piston (21), liquid film (22) and gas bubble (23).

The occurrence of an intermittent flow gives rise to a fluctuation in the flow rate between a maximum value and a minimum value associated, respectively, with the flow rate of liquid produced by the piston and that produced by the liquid film which follows the gas bubble. For accurate dimensioning of the capacity of the separator it is therefore necessary to use the maximum flow of liquid as a design condition.

The dimensioning of the helix for the case of a flow rate which is lower than the maximum flow rate and the consequent occurrence of an excessive height of liquid in the expansion chamber, resulting from the "choking" of liquid in the transition region to the helix, may give rise to liquid carry-over to the gas line. This phenomenon is closely related to the characteristics of slug flow, which may, under certain operational conditions, arise at the entry to the separator.

Although the present specification describes an intermediate helical region of variable pitch equipped with two helix starts, said region may be equipped with a larger number of uniformly spaced helix starts. Similarly, although the present specification describes an auxiliary helix which extends only as far as the start of the secondary separator, it may continue past this point and reach the lower part of the equipment. This may occur in the case of there being more than one auxiliary helix. In this case, the equipment operates as if there were a number of separators operating in parallel.

Although a description has been given of an embodiment of the invention which is particularly applicable inside wells, it is applicable to industry in general, in which situation the dimensional restrictions are considerably lessened.

What is claimed is:

1. A helical separator for promoting the separation of a liquid/gas mixture into two distinct substantially single-phase streams comprising:
   an expansion chamber,
   a secondary separator comprising at least one constant pitch helix-shaped guide vane which has adjacent to a lower surface thereof, apertures which permit the passage of gas into a pipe extending through the separator, and
   an intermediate region comprising at least one variable pitch helix-shaped guide vane located between the expansion chamber and the secondary separator, said variable pitch helix-shaped guide vane having a pitch which decreases in a direction of flow of said mixture from said expansion chamber to said secondary separator.

2. A helical separator according to claim 1, wherein the constant pitch helix-shaped guide vane of the secondary separator is a continuation of the variable pitch helix-shaped guide vane of the intermediate region.

3. A helical separator according to claim 1, wherein the intermediate region contains at least two variable pitch helix-shaped guide vanes, said vanes being a principal helix-shaped guide vane extending as far as, and being a continuation of, the constant pitch helix-shaped guide vane of said secondary separator and at least one auxiliary helix-shaped guide vane terminating at an end of the intermediate region adjacent said secondary separator, wherein each helix-shaped guide vane is spaced around the circumference of the separator.

4. The helical separator of claim 3, wherein the auxiliary helix-shaped guide vane is out of phase with the principal helix-shaped guide vane by 180°.

5. The helical separator of claim 2, wherein the intermediate region has a plurality of helix-shaped guide vanes spaced around the circumference of the separator with at least one of said helix-shaped guide vanes extending through a lower region of the separator.

6. The helical separator of claim 2, wherein an additional pipe is concentrically disposed within said pipe extending through the separator, wherein said apertures permit the passage of gas from the secondary separator into an annular space between the two concentric pipes.

7. The helical separator according to claim 6, further comprising a tertiary separator comprising a reservoir for liquid disposed in a lower region of the separator, said reservoir having a variable height in accordance with the operational conditions with said pipe disposed in contact with a lower base of the separator and has, in a lower portion thereof, transverse orifices which permit entry of liquid inside the pipe and wherein a pump is positioned inside said pipe in fluid communication with said additional pipe for pumping the liquid through said additional pipe.

8. The helical separator according to claim 7, wherein said expansion chamber, said secondary separator, said intermediate region and said tertiary separator are all disposed in an elongated cylindrical container adapted to be fitted inside a well.

9. The helical separator according to claim 8, wherein said expansion chamber occupies an annular region between an inner surface of an upper portion of said cylindrical container and an outer cylindrical surface of said pipe and wherein an entry passage is provided in said cylindrical container for introducing the liquid/gas mixture into the expansion chamber as a tangential stream.

10. The helical separator according to claim 9, further comprising apertures in said pipe for the passage of gas separated in the expansion chamber from the expansion chamber to the annular space between the two concentric pipes.

11. A method of operating the helical separator as set forth in claim 1, comprising the steps of separating gases in drilling fluids in an underbalanced drilling process in petroleum wells and draining off solid sediments which accumulate in a lower part of the separator.

* * * * *